United States Patent
Takahashi et al.

(10) Patent No.: US 11,466,156 B2
(45) Date of Patent: Oct. 11, 2022

(54) ASPHALT COMPOSITION

(71) Applicant: KAO CORPORATION, Tokyo (JP)

(72) Inventors: Hiromichi Takahashi, Wakayama (JP); Ryoji Iwamoto, Wakayama (JP); Ryoichi Hashimoto, Iwade (JP); Eiji Shirai, Wakayama (JP)

(73) Assignee: KAO CORPORATION, Tokyo (JP)

( * ) Notice: Subject to any disclaimer, the term of this patent is extended or adjusted under 35 U.S.C. 154(b) by 41 days.

(21) Appl. No.: 16/318,921

(22) PCT Filed: Jul. 18, 2017

(86) PCT No.: PCT/JP2017/025919
§ 371 (c)(1),
(2) Date: Jan. 18, 2019

(87) PCT Pub. No.: WO2018/037771
PCT Pub. Date: Mar. 1, 2018

(65) Prior Publication Data
US 2019/0233647 A1 Aug. 1, 2019

(30) Foreign Application Priority Data
Aug. 23, 2016 (JP) .............................. JP2016-162988

(51) Int. Cl.
C08L 95/00 (2006.01)
C08L 67/02 (2006.01)
E01C 7/30 (2006.01)
C08L 101/02 (2006.01)
C08K 3/00 (2018.01)

(52) U.S. Cl.
CPC .............. *C08L 95/005* (2013.01); *C08K 3/00* (2013.01); *C08L 67/02* (2013.01); *C08L 95/00* (2013.01); *C08L 101/02* (2013.01); *E01C 7/30* (2013.01); *C08L 2555/52* (2013.01); *C08L 2555/80* (2013.01)

(58) Field of Classification Search
CPC .... C08L 95/005; C08L 67/02; C08L 2555/80; C08L 2555/52; E01C 7/30
See application file for complete search history.

(56) References Cited

U.S. PATENT DOCUMENTS

| | | | | |
|---|---|---|---|---|
| 4,738,996 A * | 4/1988 | Vonk | ....................... | C08L 95/00 524/59 |
| 4,994,508 A * | 2/1991 | Shiraki | .................... | C08L 95/00 524/14 |
| 5,772,749 A * | 6/1998 | Schilling | ............. | C08G 73/028 106/277 |
| 5,990,206 A | 11/1999 | Tanaka et al. | | |
| 2015/0361318 A1 | 12/2015 | Crews et al. | | |

FOREIGN PATENT DOCUMENTS

| | | |
|---|---|---|
| EP | 0307499 A1 | 3/1989 |
| EP | 0 425 151 A1 | 5/1991 |
| JP | 62-218448 A | 9/1987 |
| JP | 1-105732 A | 4/1989 |
| JP | 4-8766 A | 1/1992 |
| JP | 4-320453 A | 11/1992 |
| JP | 6-329918 A | 11/1994 |
| JP | 2000-44808 A | 2/2000 |
| JP | 2000-72499 A | 3/2000 |
| JP | 2005-126998 A | 5/2005 |
| JP | 2013-67552 A | 4/2013 |
| JP | 2013-193912 A | 9/2013 |
| JP | 2013222044 A | 10/2013 |
| KR | 10-1565128 B1 | 11/2015 |

OTHER PUBLICATIONS

International Search Report issued in PCT/JP2017/025919 (PCT/ISA/210), dated Aug. 29, 2017.
Ahmedzade et al., "Effect of polyester resin additive on the properties of asphalt binders and mixtures," Construction and Building Materials, vol. 22, 2008, pp. 481-486.
Ajinmoto Fine-Techno Co., Inc., "AJISPER and PLENACT Dispersing Agent," URL:http://www.taiso.com.tw/product/info/AJISPER%20&%20PENACT.pdf, Feb. 26, 2016, pp. 1-13.
Akzo Nobel Surfactants, "Rediset WMX: Improved performance at lower temperature," Akzo Nobel Asphalt Applications, 2008, 6 pages.
Curtis, "A Literature Review of Liquid Antistripping And Test for Measuring Stripping," Strategic Highway Research Program, Jul. 1990, pp. 1-19 (23 pages total).
Extended European Search Report for European Application No. 17843258.9, dated Feb. 27, 2020.
Fedors, "A Method for Estimating Both the Solubility Parameters and Molar Volumes of Liquids," Polymer Engineering and Science, vol. 14, No. 2, Feb. 1974, pp. 147-154.
Hansen, "The Three Dimensional Solubility Parameter—Key to Paint Component Affinities: I. Solvents, Plasticizers, Polymers and Resins," Journal of Paint Technology, vol. 39, No. 505, Feb. 1967, pp. 104-117.
Lubrizol, "SOLPLUS K240," Technical Data Sheet, Jan. 22, 2014, pp. 1-2.

(Continued)

*Primary Examiner* — Yong L Chu
(74) *Attorney, Agent, or Firm* — Birch, Stewart, Kolasch & Birch, LLP

(57) ABSTRACT

The present invention relates to an asphalt composition which is excellent in storage stability at a high temperature, an asphalt mixture, a method for producing the same, and a road paving method. Provided are [1] an asphalt composition containing asphalt, a polyester resin, and a dispersant; [2] an asphalt mixture containing the asphalt composition as set forth above in [1] and an aggregate; [3] a road paving method including a step of laying the asphalt mixture as set forth above in [2], thereby forming an asphalt paving material layer; and [4] a method for producing an asphalt mixture including mixing asphalt, a polyester resin, a dispersant, and an aggregate at 130° C. or higher and 200° C. or lower.

8 Claims, No Drawings

(56) References Cited

OTHER PUBLICATIONS

Lubrizol, "SOLSPERSE 11200," Technical Data Sheet, Dec. 6, 2017, pp. 1-2.
Lubrizol, "SOLSPERSE 13940," Technical Data Sheet, Feb. 27, 2013, pp. 1-2.
Lubrizol, "SOLSPERSE 38500," Technical Data Sheet, Feb. 4, 2013, 2017, pp. 1-2.
Miller-Chou et al., "A review of polymer dissolution," Prog. Polym. Sci., vol. 28, 2003, pp. 1223-1270.
Shell Chemicals, "SHELLSOL D40," Data Sheet, Nov. 2001, 2 pages.
Sojobi et al., "Recycling of polyethylene terephthalate (PET) plastic bottle wastes in bituminous asphaltic concrete," Cogent Engineering, vol. 3, No. 1, Jan. 15, 2016, pp. 1-28 (29 pages total).
Whim et al. (Ed.), "Solubility parameters," Directory of Solvents, 1996, p. 586 (4 pages total).

* cited by examiner

ASPHALT COMPOSITION

FIELD OF THE INVENTION

The present invention relates to an asphalt composition, an asphalt mixture, a method for producing the same, and a road paving method.

BACKGROUND OF THE INVENTION

Asphalt pavement using an asphalt composition has been performed for paving driveways, parking spaces, cargo yards, sidewalks, etc., because of relatively easy construction and a short period of time from beginning of paving works to traffic start.

The asphalt pavement includes a road surface which is formed of an asphalt mixture containing aggregates bonded with each other through asphalt, and hence, paved roads exhibit good hardness and good durability.

However, a rut of a wheel or a crack is generated on the asphalt pavement surface due to long-term use. Therefore, in such a case, repair of the pavement is inevitably needed, which results in increased maintenance costs and significant influence on car traffic.

PTL 1 describes a composition for road pavement, which is used for constructing a surface layer (topcoat layer) of a pavement. Here, as a composition for road pavement having sufficient strength and capable of revealing the strength at an early stage and making it possible to efficiently form or repair a pavement, PTL 1 describes a composition for road pavement containing a water dispersion resulting from neutralization of a resin (A) having an acid value of 3 to 100 KOHmg/g with a basic compound, and a silane coupling agent having an alkoxy group having 1 to 5 carbon atoms and an amino group, the composition constituting a binder for an aggregate in the road pavement or a surface layer of a pavement.

As an asphalt composition suitable for road pavement, which is capable of being laid even at low temperatures and preventing the rutting of a wheel of a running vehicle on a road surface which is stable even at high temperatures, PTL 2 describes an asphalt composition containing asphalt and a polyester-based polymer.

CITATION LIST

Patent Literature

PTL 1: JP 2005-126998 A
PTL 2: JP 04-008766 A

SUMMARY OF THE INVENTION

The present invention relates to the following [1] to [4].
[1] An asphalt composition containing asphalt, a polyester resin, and a dispersant.
[2] An asphalt mixture containing the asphalt composition as set forth above in [1] and an aggregate.
[3] A road paving method including a step of laying the asphalt mixture as set forth above in [2], thereby forming an asphalt paving material layer.
[4] A method for producing an asphalt mixture, including mixing asphalt, a polyester resin, a dispersant, and an aggregate at 130° C. or higher and 200° C. or lower.

DETAILED DESCRIPTION OF THE INVENTION

Hitherto, in the case of using a composition containing asphalt and a polyester resin, since the asphalt is stored in a molten state, there are some cases where the polyester resin is precipitated or separated in the mixture without providing sufficient uniformity of the mixture.

Now, the present invention relates to an asphalt composition or an asphalt mixture, each being excellent in storage stability at a high temperature and high in dry strength, a method for producing the same, and a road paving method using the same.

The present invention relates to the following [1] to [4].
[1] An asphalt composition containing asphalt, a polyester resin, and a dispersant.
[2] An asphalt mixture containing the asphalt composition as set forth above in [1] and an aggregate.
[3] A road paving method including a step of laying the asphalt mixture as set forth above in [2], thereby forming an asphalt paving material layer.
[4] A method for producing an asphalt mixture, including mixing asphalt, a polyester resin, a dispersant, and an aggregate at 130° C. or higher and 200° C. or lower.

In accordance with the present invention, an asphalt composition or an asphalt mixture, each being excellent in storage stability at a high temperature, an asphalt mixture, a method for producing the same, and a road paving method using the composition are obtained.

In addition, in accordance with the present invention, an asphalt composition from which a pavement surface exhibiting excellent dry strength is obtained, an asphalt mixture, a method for producing the same, and a road paving method.

[Asphalt Composition]

The asphalt composition of the present invention contains asphalt, a polyester resin, and a dispersant. In accordance with the asphalt composition of the present invention, an asphalt composition which is excellent in storage stability at a high temperature is obtained. Furthermore, by applying this technology, an asphalt mixture, a method for producing the same, and a road paving method can be provided.

Although reasons why the effects of the present invention are obtained are not always elucidated, the following may be considered.

Hitherto, with respect to the technology in which the strength is improved by adding a polyester resin to asphalt, it was considered that in view of the matter that the asphalt and the polyester resin are mixed at a high temperature and then used, a satisfactory mixture is obtained. However, actually, it has become clear that when the asphalt and the polyester resin are merely mixed, the polyester resin having a large specific gravity sediments due to a difference in specific gravity. In the present invention, it may be considered that by using a dispersant to make the particle diameter of the polyester resin small, the stable composition has been obtained. As is able to be explained by the Stokes' formula, it may be considered that by making the particle diameter of a melt of the polyester resin in the asphalt small, the stability has been improved. In addition, it may be conjectured that the finely-divided polyester resin is thoroughly diffused into the aggregates, and the contact area between the aggregate and the polyester resin increases; and as a result, the strength has been more improved as compared with a material obtained by merely mixing the asphalt and the polyester resin.

[Asphalt]

As the asphalt, for example, various kinds of asphalts may be used. Examples thereof include not only straight asphalt that is petroleum asphalt for pavement, but also modified asphalts.

The straight asphalt as referred to herein refers to a residual bituminous material obtained by treating a crude oil with an atmospheric distillation apparatus, a vacuum distillation apparatus, etc.

Examples of the modified asphalt include blown asphalts; and asphalts modified with a polymer material, such as a thermoplastic elastomer and a thermoplastic resin.

Examples of the thermoplastic elastomer include a styrene/butadiene block copolymer (hereinafter also referred to simply as "SB"), a styrene/butadiene/styrene block copolymer (hereinafter also referred to simply as "SBS"), a styrene/isoprene block copolymer (hereinafter also referred to simply as "SI"), a styrene/isoprene/styrene block copolymer (hereinafter also referred to simply as "SIS"), an ethylene/vinyl acetate copolymer (hereinafter also referred to as "EVA"), an ethylene/acrylic acid ester copolymer, and a styrene/ethylene/butylene/styrene block copolymer.

Examples of the thermoplastic resin include an ethylene/vinyl acetate copolymer, an ethylene/ethyl acrylate copolymer, polyethylene, and polypropylene.

The amount of the thermoplastic elastomer or the thermoplastic resin in the modified asphalt is preferably 0.5% by mass or more, more preferably 1% by mass or more, and still more preferably 2% by mass or more, and it is preferably 10% by mass or less, more preferably 8% by mass or less, and still more preferably 5% by mass or less.

Of these, from the viewpoint of versatility, straight asphalt is preferred. On the other hand, from the viewpoint that high strength is required in airport facilities, bayside facilities, etc., it is preferred to use modified asphalt.

A penetration of the asphalt is preferably more than 40, and it is preferably 120 or less, more preferably 80 or less, and still more preferably 60 or less. A measurement method of the penetration conforms to the method prescribed in JIS K2207:2006. It is to be noted that when a prescribed needle penetrates vertically into a sample under test conditions prescribed in JIS K2207:2006, 0.1 mm of a length of the needle penetrated into the sample is expressed as 1.

The content of the asphalt in the asphalt composition is preferably 60% by mass or more, more preferably 70% by mass or more, and still more preferably 75% by mass or more, and it is preferably 98% by mass or less, more preferably 95% by mass or less, and still more preferably 90% by mass or less.

[Polyester Resin]

The polyester resin contains an alcohol component-derived constituent unit and a carboxylic acid component-derived constituent unit.

In the polyester, the alcohol component-derived constituent unit as referred to herein means a structure resulting from elimination of a hydrogen atom from the hydroxy group of the alcohol component; and the carboxylic acid component-derived constituent unit as referred to herein means a structure resulting from elimination of a hydroxy group from the carboxy group of the carboxylic acid component. It is to be noted that examples of the polyester resin include polyester resins obtained through polycondensation of the alcohol component and the carboxylic acid component, and salts thereof.

<Alcohol Component>

As the alcohol component, diols or trihydric or higher-hydric and octahydric or lower-hydric alcohols may be used.

Examples of the alcohol component include aliphatic diols, aromatic diols, and trihydric or higher-hydric alcohols. These alcohol components may be used alone or in combination with two or more kinds thereof.

From the viewpoint of obtaining excellent dry strength, the alcohol component preferably contains an alkylene oxide adduct of bisphenol A, and more preferably contains an alkylene oxide adduct of bisphenol A represented by the following formula (I):

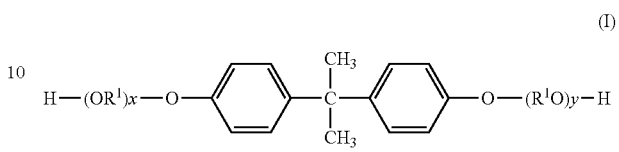

(I)

wherein $OR^1$ and $R^1O$ each represent an alkylene oxide; $R^1$ represents an alkylene group having 2 or 3 carbon atoms; x and y each represent a positive number expressing an average addition molar number of the alkylene oxide; and a sum total of x and y is 1 or more, and preferably 1.5 or more, and it is 16 or less, preferably 8 or less, and more preferably 4 or less.

Examples of the alkylene oxide adduct of bisphenol A represented by the formula (I) include a propylene oxide adduct of 2,2-bis(4-hydroxyphenyl)propane and an ethylene oxide adduct of 2,2-bis(4-hydroxyphenyl)propane. Of these, a combination of a propylene oxide adduct of 2,2-bis(4-hydroxyphenyl)propane and an ethylene oxide adduct of 2,2-bis(4-hydroxyphenyl)propane is preferred.

From the viewpoint of increasing melt-dispersibility in the asphalt and obtaining excellent dry strength, the amount of the alkylene oxide adduct of bisphenol A in the alcohol component is preferably 65 mol % or more, and more preferably 80 mol % or more, and it is 100 mol % or less, and more preferably 95 mol % or less.

A molar ratio of the propylene oxide adduct of bisphenol A to the ethylene oxide adduct of bisphenol A is preferably 0/100 or more, and more preferably 3/97 or more, and from the viewpoint of more increasing the melt-dispersibility in the asphalt and obtaining more excellent dry strength, it is preferably 50/50 or less, more preferably 30/70 or less, and still more preferably 10/90 or less.

The aliphatic diol is preferably an aliphatic diol having 2 or more and 20 or less carbon atoms. Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

In the case where the aliphatic diol is contained, from the viewpoint of increasing the melt-dispersibility in the asphalt and obtaining excellent dry strength, the amount of the aliphatic diol in the alcohol component is preferably 1 mol % or more, and more preferably 5 mol % or more, and it is preferably 30 mol % or less, and more preferably 10 mol % or less.

The trihydric or higher-hydric alcohol is preferably a trihydric alcohol. Examples of the trihydric or higher-hydric alcohol include glycerin.

In the case where the trihydric or higher-hydric alcohol is contained, from the viewpoint of increasing the melt-dispersibility in the asphalt and obtaining excellent dry strength, the amount of the trihydric or higher-hydric alcohol in the alcohol component is 1 mol % or more, and more preferably 3 mol % or more, and it is preferably 30 mol % or less, and more preferably 10 mol % or less.

<Carboxylic Acid Component>

Examples of the carboxylic acid component include aliphatic dicarboxylic acids, aromatic dicarboxylic acids, trivalent or higher-valent and hexavalent or lower-valent carboxylic acids, and acid anhydrides or alkyl (carbon number: 1 or more and 3 or less) esters thereof. These carboxylic acid components may be used alone or in combination of two or more kinds thereof.

From the viewpoint of more improving the dry strength, the carbon number of the main chain of the aliphatic dicarboxylic acid is preferably 3 or more, and more preferably 4 or more, and it is preferably 10 or less, and more preferably 6 or less.

Specific examples thereof include fumaric acid, maleic acid, oxalic acid, malonic acid, citraconic acid, itaconic acid, glutaconic acid, succinic acid, adipic acid, suberic acid, azelaic acid, sebacic acid, and dodecane diacid. In addition, examples of the aliphatic dicarboxylic acid also include succinic acids substituted with an alkyl group having 1 or more and 20 or less carbon atoms or an alkenyl group having 2 or more and 20 or less carbon atoms, such as dodecyl succinic acid, dodecenyl succinic acid, and octenyl succinic acid.

Examples of the aromatic dicarboxylic acid include terephthalic acid, phthalic acid, isophthalic acid, and naphthalenedicarboxylic acid.

Of the carboxylic acids, fumaric acid, maleic acid, adipic acid, terephthalic acid, and isophthalic acid are preferred.

The trivalent or higher-valent and hexavalent or lower-valent carboxylic acid is preferably a trivalent carboxylic acid.

Examples of the trivalent or higher-valent and hexavalent or lower-valent carboxylic acid include trimellitic acid, 2,5,7-naphthalenetricarboxylic acid, and pyromellitic acid, and from the viewpoint of more improving the dry strength, trimellitic acid is preferred.

In the case where the trivalent or higher-valent and hexavalent or lower-valent carboxylic acid is contained, from the viewpoint of more improving the dry strength, the content of the trivalent or higher-valent and hexavalent or lower-valent carboxylic acid in the carboxylic acid component is preferably 1 mol % or more, and more preferably 5 mol % or more, and it is preferably 30 mol % or less, and more preferably 10 mol % or less.

It is to be noted that from the viewpoint of controlling physical properties, a monohydric alcohol may be properly contained in the alcohol component, and a monovalent carboxylic acid compound may be properly contained in the carboxylic acid component.

(Molar Ratio of Carboxylic Acid Component-Derived Constituent Unit to Alcohol Component-Derived Constituent Unit)

From the viewpoint of controlling the acid value, a molar ratio of the carboxylic acid component-derived constituent unit to the alcohol component-derived constituent unit [(carboxylic acid component)/(alcohol component)] is preferably 0.7 or more, and more preferably 0.8 or more, and it is preferably 1.5 or less, more preferably 1.3 or less, and still more preferably 1.1 or less.

(Physical Properties of Polyester Resin)

An acid value of the polyester resin is preferably 2 mgKOH/g or more, more preferably 3 mgKOH/g or more, and still more preferably 5 mgKOH/g or more, and it is preferably 30 mgKOH/g or less, more preferably 20 mgKOH/g or less, and still more preferably 18 mgKOH/g or less.

A softening point of the polyester resin is preferably 90° C. or higher, more preferably 95° C. or higher, and still more preferably 100° C. or higher from the viewpoint of exhibiting high adhesive strength to the aggregate and improving the dry strength, and it is preferably 125° C. or lower, more preferably 120° C. or lower, and still more preferably 115° C. or lower from the viewpoint of providing excellent melt-dispersibility in the asphalt and improving the dry strength.

From the viewpoint of improving the dry strength, a glass transition point of the polyester resin is preferably 40° C. or higher, and more preferably 45° C. or higher, and it is preferably 100° C. or lower, more preferably 90° C. or lower, still more preferably 80° C. or lower, yet still more preferably 70° C. or lower, even yet still more preferably 60° C. or lower, even still more preferably 55° C. or lower, and even still more further preferably 50° C. or lower.

From the viewpoint of exhibiting high adhesive strength to the aggregate and improving the dry strength, a number average molecular weight of the polyester resin is preferably 3,000 or more, more preferably 3,500 or more, still more preferably 3,800 or more, and yet still more preferably 4,000 or more, and it is preferably 8,000 or less, more preferably 7,000 or less, still more preferably 6,000 or less, and yet still more preferably 5,000 or less.

The acid value, the softening point, the glass transition point, and the number average molecular weight may be measured by the methods described in the section of Examples. It is to be noted that the acid value, the softening point, the glass transition point, and the number average molecular weight may be controlled by a raw material monomer composition, a molecular weight of monomer, a catalyst amount, or reaction conditions.

(Production Method of Polyester Resin)

Although a method for producing the polyester resin is not particularly limited, for example, the polyester resin may be produced by subjecting the alcohol component and the carboxylic acid component as described above to polycondensation.

Although a temperature of the polycondensation reaction is not particularly limited, it is preferably 160° C. or higher and 260° C. or lower from the viewpoint of reactivity.

For the polycondensation reaction, a tin(II) compound not having an Sn—C bond, such as tin(II) di(2-ethylhexanoate), may be used as a catalyst in an amount of preferably 0.01 parts by mass or more, and more preferably 0.2 parts by mass or more, and preferably 1.5 parts by mass or less, and more preferably 0.6 parts by mass or less, based on 100 parts by mass of a total amount of the alcohol component and the carboxylic acid component.

For the polycondensation reaction, in addition to the catalyst, a pyrogallol compound, such as gallic acid, may be used as an esterification catalyst in an amount of preferably 0.001 parts by mass or more, more preferably 0.005 parts by mass or more, and still more preferably 0.01 parts by mass or more, and preferably 0.15 parts by mass or less, more preferably 0.10 parts by mass or less, and still more preferably 0.05 parts by mass or less, based on 100 parts by mass of a total amount of the alcohol component and the carboxylic acid component.

From the viewpoint of more improving the storage stability at a high temperature, a dispersion particle diameter of the polyester resin in the asphalt composition is preferably 1,000 μm or less, more preferably 500 μm or less, and still more preferably 100 μm or less. Although the dispersion particle diameter is not particularly limited, it is preferably 0.1 μm or more, preferably 1 μm or more, and preferably 5 μm or more.

The measurement method of the dispersion particle diameter conforms to the method described in the section of Examples.

(Ratio of Polyester Resin)

From the viewpoint of improving the dry strength, a ratio of the polyester resin in the asphalt composition is preferably 0.5 parts by mass or more, more preferably 1 part by mass or more, still more preferably 2 parts by mass or more, yet still more preferably 5 parts by mass or more, even yet still more preferably 8 parts by mass or more, even still more preferably 10 parts by mass or more, and even still more further preferably 15 parts by mass or more, and it is preferably 40 parts by mass or less, more preferably 30 parts by mass or less, and still more preferably 25 parts by mass or less, based on 100 parts by mass of the asphalt.

[Dispersant]

The asphalt composition contains a dispersant.

The dispersant is preferably one capable of being dissolved in the asphalt and having an affinity with the polyester resin.

Examples of the dispersant include polymer dispersants and surfactants, such as polyoxyethylene alkylamines and alkanolamines.

Examples of the polymer dispersant include a polyamide amine and a salt thereof, a polycarboxylic acid and a salt thereof, a high-molecular weight unsaturated acid ester, a modified polyurethane, a modified polyester, a modified poly(meth)acrylate, a (meth)acrylic copolymer, and a naphthalenesulfonic acid formalin condensate. These dispersants may be used alone or in combination of two or more thereof.

From the viewpoint of improving the high-temperature storage stability, the dispersant is preferably a polymer dispersant. It is to be noted that the "polymer dispersant" as referred to in the present invention means a dispersant having a weight average molecular weight of 1,000 or more. Although the weight average molecular weight varies with the polymer species, it is preferably 2,000 or more, and more preferably 4,000 or more, and it is preferably 80,000 or less, and more preferably 40,000 or less.

From the viewpoint of improving the high-temperature storage stability of the polyester resin in the asphalt composition and from the viewpoint of improving the dry strength, the dispersant is preferably a dispersant that is soluble in a solvent having an SP value of 10 $(cal/cm)^{1/2}$ or less. Specifically, the dispersant is preferably one that is soluble in any of toluene (SP value: 8.9 $(cal/cm)^{1/2}$), n-hexane (SP value: 7.3 $(cal/cm)^{1/2}$), and methyl ethyl ketone (SP value: 9.3 $(cal/cm)^{1/2}$).

Specific numerical values of the SP value of a solvent are described in C. M. Hansen: J. Paint Tech., 39[505], 104-117 (1967). With respect to those not described, simply, the Fedors' estimation method is adopted (R. F. Fedors: Polym. Eng. Sci., 14[2], 147-154 (1974)).

In the case where the dispersant is dissolved in a solvent to an extent of 10 g/100 mL or more, it should be construed that the dispersant is soluble in that solvent.

From the viewpoint of improving the high-temperature storage stability of the polyester resin in the asphalt composition, the dispersant preferably has a basic functional group.

The basic functional group means a group such that a pKa of a conjugate acid is −3 or more. The pKa of the conjugate acid of the basic functional group is preferably −1 or more, and more preferably 0 or more, and it is preferably 15 or less. It is to be noted that this pKa means a calculated value determined by ACD/ChemSketch (ACD/Labs 8.00 Release Product Version: 8.08).

Examples of the basic functional group include an amino group and an imino group.

The dispersant preferably has a quaternary ammonium group or an amide group.

From the viewpoint of improving the high-temperature storage stability, a base number of the dispersant is preferably 10 mgKOH/g or more, more preferably 20 mgKOH/g or more, and still more preferably 30 mgKOH/g or more, and it is preferably 150 mgKOH/g or less, more preferably 120 mgKOH/g or less, and still more preferably 100 mgKOH/g or less.

As for the measurement method of the base number, the measurement is performed by the method prescribed in JIS K7237:1995.

Examples of the commercially available dispersant include DISPER Series byk-101, byk-130, byk-161, byk-162, byk-170, byk-2020, byk-2164, and byk-LPN21324, all of which are available from BYK Additives & Instruments; SOLSPERSE Series 9000, 11200, 13240, 13650, 13940, 17000, 18000, 24000, 28000, 32000, 38500, and 71000, all of which are available from Lubrizol Corp.; SOLPLUS Series K200, K210, K220, K240, K241, K500, and K251, all of which are available from Lubrizol Corp.; AJISPER Series PB821, PB822, PB880, and PB881, all of which are available from Ajinomoto Fine-Techno Co., Inc.; EFKA Series EFKA46, 47, 48, 49, 4010, 4047, 4050, 4165, and 5010, all of which are available from BASF SE; FLOWLEN TG-710, available from Kyoeisha Chemical Co., Ltd.; and TAMN-15, available from Nikko Chemicals Co., Ltd.

From the viewpoint of improving the high-temperature storage stability, the content of the dispersant is preferably 0.5 parts by mass or more, more preferably 1 part by mass or more, still more preferably 2 parts by mass or more, yet still more preferably 3 parts by mass or more, and even yet still more preferably 5 parts by mass or more, and it is preferably 80 parts by mass or less, more preferably 60 parts by mass or less, still more preferably 40 parts by mass or less, yet still more preferably 30 parts by mass or less, and even yet still more preferably 20 parts by mass or less, based on 100 parts by mass of the polyester resin.

A mixing order of the respective components of the asphalt composition is not particularly limited, and it may be any mixing order. Namely, the asphalt, the polyester resin, and the dispersant may be mixed at the same time, or after mixing the asphalt and the dispersant in advance, the resulting mixture may be further mixed with the polyester resin. In addition, after mixing the dispersant and the polyester resin in advance to prepare a polyester mixture, the resulting polyester mixture may be further mixed with the asphalt. In addition, a mixing order of other polymer material that is a modifier of the asphalt, such as a thermoplastic elastomer and a thermoplastic resin, is not particularly limited, either. The asphalt, the other polymer material, the dispersant, and the polyester resin may be mixed at the same time; a mixture of the asphalt and the other polymer material may be mixed with the dispersant and the polyester resin; or the asphalt may be mixed with a mixture of the other polymer material, the dispersant, and the polyester resin.

Although a mixing temperature of the respective components of the asphalt composition is not particularly limited, and any mixing temperature may be adopted so long as it is a softening point of the asphalt or higher, it is preferably a softening point of the polyester resin or higher, and preferably a temperature higher by 100° C. than the softening point of the polyester resin, or lower.

[Asphalt Mixture]

The asphalt mixture of the present invention contains the asphalt composition as described above and the aggregate.

Namely, the asphalt mixture contains the asphalt, the polyester resin, the dispersant, and the aggregate.

From the viewpoint of improving the storage stability at a high temperature, the content of the asphalt in the asphalt mixture is preferably 2% by mass or more, and more preferably 3% by mass or more, and it is preferably 15% by mass or less, more preferably 10% by mass or less, and still more preferably 8% by mass or less.

Suitable contents of the polyester resin and the dispersant are the same as those in the aforementioned asphalt composition.

[Aggregate]

The aggregate may be, for example, optionally selected from crushed stone, cobble stone, gravel, sand, reclaimed aggregate, and ceramics, and used.

As the aggregate, all of a coarse aggregate having an average particle diameter of 2.36 mm or more and a fine aggregate having an average particle diameter of less than 2.36 mm may be used. Examples of the coarse aggregate include No. 7 crushed stone having a particle diameter range of 2.36 mm or more and 4.75 mm or less, No. 6 crushed stone having a particle diameter range of 4.75 mm or more and 13.2 mm or less, No. 5 crushed stone having a particle diameter range of 13.2 mm or more and 19 mm or less, and No. 4 crushed stone having a particle diameter range of 19 mm or more and 31.5 mm or less.

The fine aggregate is preferably a fine aggregate having a particle diameter of 0.075 mm or more and less than 2.36 mm.

Examples of the fine aggregate include river sand, hill sand, mountain sand, sea sand, crushed sand, fine sand, screenings, crushed stone dust, silica sand, artificial sand, glass cullet, molding sand, and reclaimed aggregate-crushed sand.

The aforementioned particle diameter is a value prescribed in JIS 5001:1995.

Of these, a combination of the coarse aggregate and the fine aggregate is preferred.

It is to be noted that the fine aggregate may contain a filler having an average particle diameter of less than 0.075 mm (for example, sand). A lower limit value of the average particle diameter of the filler is, for example, 0.001 mm or more.

From the viewpoint of improving the dry strength, the average particle diameter of the filler is preferably 0.001 mm or more, and from the same viewpoint, it is preferably 0.05 mm or less, more preferably 0.03 mm or less, and still more preferably 0.02 mm or less. The average particle diameter of the filler may be measured by a laser diffraction particle size distribution analyzer. Here, the average particle diameter means an average particle diameter of 50% cumulative volume.

[Measurement Method of Average Particle Diameter of Filler]

The average particle diameter of the filler is a value measured by a laser diffraction particle size distribution analyzer (LA-950, manufactured by HORIBA, Ltd.) with the following conditions.

Measurement method: Flow method
Dispersion medium: Ethanol
Sample preparation: 2 mg/100 mL
Dispersing method: Stirring and 1 minute of built-in ultrasonic waves Examples of the filler include sand, fly ash, calcium carbonate, and hydrated lime. Of these, calcium carbonate is preferred from the viewpoint of improving the dry strength.

A mass ratio of the coarse aggregate to the fine aggregate is preferably 10/90 or more, more preferably 20/80 or more, and still more preferably 30/70 or more, and it is preferably 90/10 or less, more preferably 80/20 or less, and still more preferably 70/30 or less.

The content of the aggregate is preferably 1,000 parts by mass or more, more preferably 1,200 parts by mass or more, and still more preferably 1,400 parts by mass or more, and it is preferably 3,000 parts by mass or less, more preferably 2,500 parts by mass or less, and still more preferably 2,000 parts by mass or less, based on 100 parts by mass of a sum total of the asphalt and the polyester resin.

Suitable blending examples of the asphalt mixture of the present invention are as follows.

(1) An example of the asphalt mixture includes, for example, 30% by volume or more and less than 45% by volume of the coarse aggregate, 30% by volume or more and 50% by volume or less of the fine aggregate, 5% by volume or more and 10% by volume or less of the asphalt, and the polyester resin (fine-graded asphalt).

(2) An example of the asphalt mixture includes, for example, 45% by volume or more and less than 70% by volume of the coarse aggregate, 20% by volume or more and 45% by volume or less of the fine aggregate, 3% by volume or more and 10% by volume or less of the asphalt, and the polyester resin (dense-graded asphalt).

(3) An example of the asphalt mixture includes, for example, 70% by volume or more and 80% by volume or less of the coarse aggregate, 10% by volume or more and 20% by volume or less of the fine aggregate, 3% by volume or more and 10% by volume or less of the asphalt, and the polyester resin (porous asphalt).

In the present invention, other components may be further blended, as the need arises.

It is to be noted that the blending ratio of asphalt in the conventional asphalt mixtures containing the aggregate and the asphalt may be in general used by referring to an optimum asphalt amount obtained from "Formulation and Design of Asphalt Mixture" as described in "Guideline for Pavement Design and Construction" published by Japan Road Association.

In the present invention, the aforementioned optimum asphalt amount corresponds to the total amount of the asphalt and the polyester resin. In consequence, in general, the total blending amount of the asphalt and the polyester resin is preferably determined from the aforementioned optimum asphalt amount.

However, it is not needed to limit the optimum asphalt amount to the method as described in "Guideline for Pavement Design and Construction", and it may also be determined by any other methods.

[Production Method of Asphalt Mixture]

The asphalt mixture of the present invention may be used as a heated asphalt mixture not substantially containing water, or may also be used as a cold asphalt composition which is an asphalt emulsion prepared by blending the aforementioned asphalt composition with an emulsifier or water.

The asphalt composition of the present invention has such properties that the polyester resin is apt to be uniformly dispersed with the dispersant in the asphalt composition. Therefore, when used as a heated asphalt composition, it is able to effectively exhibit its characteristic features.

In the case of using the asphalt mixture of the present invention as a heated asphalt mixture, the method for producing the asphalt mixture is not particularly limited, and the asphalt mixture may be produced by any methods.

However, in general, the asphalt mixture may be produced according to any method for producing an asphalt mixture containing an aggregate and asphalt.

The method for producing the asphalt mixture of the present invention preferably includes a step of mixing the asphalt, the polyester resin, the dispersant, and the aggregate at 130° C. or higher and 200° C. or lower (hereinafter also referred to as "Step 1").

A mixing order of the respective components in Step 1 is not particularly limited, and it may be any mixing order. Namely, the asphalt, the polyester resin, the dispersant, and the aggregate may be mixed at the same time, or after mixing the asphalt, the polyester resin, and the dispersant in advance to prepare an asphalt composition, the resulting asphalt composition may be further mixed with the aggregate.

A mixing temperature in Step 1 is preferably a temperature higher than the softening point of the polyester resin. Specifically, the mixing temperature in Step 1 is preferably 130° C. or higher, and more preferably 140° C. or higher, and it is preferably 190° C. or lower, and more preferably 180° C. or lower.

A mixing time in Step 1 is, for example, 30 seconds or more, preferably 1 minute or more, more preferably 2 minutes or more, and still more preferably 5 minutes or more. Although an upper limit of the time is not particularly limited, for example, it is about 30 minutes.

As the specific production method, there may be used the conventional production method of an asphalt mixture which is known as a so-called plant mix method or premix method in which, in the step of mixing an aggregate with asphalt, the asphalt, the polyester resin, and the dispersant may be respectively charged with the aggregate heated to the aforementioned range of mixing temperature. The asphalt, the polyester resin, and the dispersant may be individually added, respectively, or the previously mixed asphalt composition may be used.

[Road Paving Method]

The asphalt mixture of the present invention is used for road pavement.

The road paving method of the present invention preferably includes a step of laying the asphalt mixture of the present invention, thereby forming an asphalt paving material layer (hereinafter also referred to as "Step 2").

The asphalt paving material layer is preferably a base layer or a surface layer.

It is to be noted that in Step 2, the asphalt mixture of the present invention may be subjected to compacting laying using the same laying machines and the same laying method as used for ordinary asphalt mixtures. In the case of using the asphalt mixture as a heated asphalt mixture, a compacting temperature thereof is preferably a temperature higher than the softening point of the polyester resin. The compacting temperature is preferably 100° C. or higher, more preferably 120° C. or higher, and still more preferably 130° C. or higher, and it is preferably 200° C. or lower, and more preferably 180° C. or lower.

With respect to the aforementioned embodiments, the present invention further discloses the following asphalt composition, asphalt mixture, and road paving method.

<1> An asphalt composition containing asphalt, a polyester resin, and a dispersant.

<2> The asphalt composition as set forth in <1>, wherein the content of the asphalt in the asphalt composition is preferably 60% by mass or more, more preferably 70% by mass or more, and still more preferably 75% by mass or more, and it is preferably 98% by mass or less, more preferably 95% by mass or less, and still more preferably 90% by mass or less.

<3> The asphalt composition as set forth in <1> or <2>, wherein an acid value of the polyester resin is preferably 2 mgKOH/g or more, more preferably 3 mgKOH/g or more, and still more preferably 5 mgKOH/g or more, and it is preferably 30 mgKOH/g or less, more preferably 20 mgKOH/g or less, and still more preferably 18 mgKOH/g or less.

<4> The asphalt composition as set forth in any of <1> to <3>, wherein a softening point of the polyester resin is preferably 90° C. or higher, more preferably 95° C. or higher, and still more preferably 100° C. or higher, and it is preferably 125° C. or lower, more preferably 120° C. or lower, and still more preferably 115° C. or lower.

<5> The asphalt composition as set forth in any of <1> to <4>, wherein a glass transition point of the polyester resin is preferably 40° C. or higher, and more preferably 45° C. or higher, and it is preferably 100° C. or lower, more preferably 90° C. or lower, still more preferably 80° C. or lower, yet still more preferably 70° C. or lower, even yet still more preferably 60° C. or lower, even still more preferably 55° C. or lower, and even still more further preferably 50° C. or lower.

<6> The asphalt composition as set forth in any of <1> to <5>, wherein a number average molecular weight of the polyester resin is preferably 3,000 or more, more preferably 3,500 or more, still more preferably 3,800 or more, and yet still more preferably 4,000 or more, and it is preferably 8,000 or less, more preferably 7,000 or less, still more preferably 6,000 or less, and yet still more preferably 5,000 or less.

<7> The asphalt composition as set forth in any of <1> to <6>, wherein a ratio of the polyester resin in the asphalt composition is preferably 0.5 parts by mass or more, more preferably 1 part by mass or more, still more preferably 2 parts by mass or more, yet still more preferably 5 parts by mass or more, even yet still more preferably 8 parts by mass or more, even still more preferably 10 parts by mass or more, and even still more further preferably 15 parts by mass or more, and it is preferably 40 parts by mass or less, more preferably 30 parts by mass or less, and still more preferably 25 parts by mass or less, based on 100 parts by mass of the asphalt.

<8> The asphalt composition as set forth in any of <1> to <7>, wherein the dispersant is a polymer dispersant.

<9> The asphalt composition as set forth in any of <1> to <8>, wherein a weight average molecular weight of the polymer dispersant is preferably 2,000 or more, and more preferably 4,000 or more, and it is preferably 80,000 or less, and more preferably 40,000 or less.

<10> The asphalt composition as set forth in any of <1> to <9>, wherein the dispersant is soluble in a solvent having an SP value of 10 or less.

<11> The asphalt composition as set forth in any of <1> to <10>, wherein the dispersant has a basic functional group.

<12> The asphalt composition as set forth in any of <1> to <11>, wherein a base number of the dispersant is preferably 10 mgKOH/g or more, more preferably 20 mgKOH/g or more, and still more preferably 30 mgKOH/g or more, and it is preferably 150 mgKOH/g or less, more preferably 120 mgKOH/g or less, and still more preferably 100 mgKOH/g or less.

<13> The asphalt composition as set forth in any of <1> to <12>, wherein the content of the dispersant is preferably 0.5 parts by mass or more, more preferably 1 part by mass or more, still more preferably 2 parts by mass or more, yet still more preferably 3 parts by mass or more, and even yet still more preferably 5 parts by mass or more, and it is preferably 80 parts by mass or less, more preferably 60 parts by mass or less, still more preferably 40 parts by mass or less, yet still more preferably 30 parts by mass or less, and even yet still more preferably 20 parts by mass or less, based on 100 parts by mass of the polyester resin.

<14> An asphalt mixture containing the asphalt composition as set forth in any of <1> to <13> and an aggregate.

<15> The asphalt mixture as set forth in <14>, wherein the aggregate is at least one selected from crushed stone, cobble stone, gravel, sand, reclaimed aggregate, and ceramics.

<16> The asphalt mixture as set forth in <14> or <15>, wherein the content of the aggregate is preferably 1,000 parts by mass or more, more preferably 1,200 parts by mass or more, and still more preferably 1,400 parts by mass or more, and it is preferably 3,000 parts by mass or less, more preferably 2,500 parts by mass or less, and still more preferably 2,000 parts by mass or less, based on 100 parts by mass of a sum total of the asphalt and the polyester resin.

<17> A road paving method including a step of laying the asphalt mixture as set forth in <14> to <16>, thereby forming an asphalt paving material layer.

<18> The road paving method as set forth in <17>, wherein the asphalt paving material layer is a base layer or a surface layer.

<19> The road paving method as set forth in <17> or <18>, wherein the laying is compacting laying.

<20> The road paving method as set forth in any of <17> to <19>, wherein a compacting temperature is preferably a temperature higher than the softening point of the polyester resin, and it is preferably 100° C. or higher, more preferably 120° C. or higher, and still more preferably 130° C. or higher, and it is preferably 200° C. or lower, and more preferably 180° C. or lower.

<21> A method for producing an asphalt mixture, including mixing asphalt, a polyester resin, a dispersant, and an aggregate at 130° C. or higher and 200° C. or lower.

<22> The method for producing an asphalt mixture as set forth in <21>, wherein a mixing temperature is preferably a temperature higher than the softening point of the polyester resin, and specifically, it is preferably 130° C. or higher, and more preferably 140° C. or higher, and it is preferably 190° C. or lower, and more preferably 180° C. or lower.

EXAMPLES

Respective physical values of resins and the like were measured and evaluated by the following methods.

[Acid Value of Polyester Resin]

An acid value of a polyester resin was measured on the basis of the method of JIS K0070:1992. However, only the measuring solvent was changed from a mixed solvent of ethanol and ether as prescribed in JIS K0070:1992 to a mixed solvent of acetone and toluene (acetone/toluene=1/1 (volume ratio)).

[Softening Point and Glass Transition Point of Polyester Resin]

(1) Softening Point:

Using a flow tester "CFT-500D" (available from Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Glass Transition Point:

Using a differential scanning calorimeter "Q-100" (available from TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the resulting sample was measured while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

[Number Average Molecular Weight of Resin]

A molecular weight distribution was measured by the gel permeation chromatography (GPC) method according to the following method, thereby determining the number average molecular weight Mn of the resin.

(1) Preparation of Sample Solution:

The resin was dissolved in chloroform such that its concentration was 0.5 g/100 mL. Subsequently, this solution was subjected to filtration with a fluororesin filter "FP-200" (available from Sumitomo Electric Industries, Ltd.) having a pore size of 2 μm to remove insoluble components, thereby preparing a sample solution.

(2) Measurement of Molecular Weight:

Using the following devices, chloroform as an eluting solution was allowed to flow at a flow rate of 1 mL/min, and the column was stabilized in a thermostat at 40° C. 100 μL of the sample solution was injected thereinto to perform the measurement. The molecular weight of the sample was calculated on the basis of a previously prepared calibration curve. As the calibration curve at this time, one prepared by using several kinds of monodisperse polystyrenes each having an already known molecular weight ($2.63 \times 10^3$, $2.06 \times 10^4$, and $1.02 \times 10^5$, all of which are available from Tosoh Corporation; and $2.10 \times 10^3$, $7.00 \times 10^3$, and $5.04 \times 10^4$, all of which are available from GL Sciences Inc.) as standard samples was used.

Analyzer: "CO-8010" (available from Tosoh Corporation)

Column: "GMH$_{XL}$"+"G3000H$_{XL}$" (all of which are available from Tosoh Corporation)

[Measurement Method of Dispersion Particle Diameter of Polyester Resin in Asphalt Composition]

0.2 g of an asphalt composition was taken on a slide glass and sandwiched with a cover glass. The assembly was placed in a thermostat at 180° C. and heated for 3 minutes, thereby making the asphalt composition uniform. Thereafter, a diameter of the polyester resin dispersed in the asphalt composition was measured with a microscope "VHX-1000" (available from Keyence Corporation), and an average value of the diameter of optionally selected 50 particles was defined as the dispersion particle diameter of the polyester resin.

[Solubility of Dispersant in Asphalt]

An asphalt composition at 180° C. obtained in each of Examples and Comparative Examples as mentioned later was spread onto a glass plate heated at 180° C. and observed with a microscope.

A: Dissolved.

B: An oil droplet of the dispersant is 10 μm or less (solubility is relatively good).

C: An oil droplet of more than 10 μm is formed or separated.

[Number of Storage Days at 180° C.]

50 g of an asphalt composition obtained in each of Examples and Comparative Examples as mentioned later was weighed into a 40-mL screw tube. The resultant was stored at 180° C. for a predetermined number of days, and the presence or absence of a precipitate of the polyester resin was observed through visual inspection.

A: Not precipitated
B: Partially precipitated
C: Precipitated

[Dry Strength]

A molded article (diameter: 101.6 mm, thickness: 63 mm) obtained in each of Examples and Comparative Examples as mentioned later was immersed in water at 25° C. for 2 hours and then dried at room temperature for 24 hours, and the strength of the resultant was measured at a descent speed of 5 mm/s by using a Marshall stability tester "LA-160" (available from Sanyo Testing Machines Co., Ltd.).

Production Example 1 (Polyester Resin A)

An alcohol component and a carboxylic acid component for a polyester resin, which are shown in Table 1, 20 g of tin(II) di(2-ethylhexanoate), and 2 g of tertiary butyl catechol were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at from 108° C. to 205° C. for 8 hours in a mantle heater in a nitrogen atmosphere. Thereafter, the resultant was allowed to react under a reduced pressure condition at 8 kPa for one hour, thereby obtaining desired Polyester Resin A.

The resulting Polyester Resin A was pulverized using a pulverizer "SF-1" (available from Sanriki Seisakusho Co., Ltd.).

Production Example 2 (Polyester Resin B)

An alcohol component and terephthalic acid for a polyester resin, which are shown in Table 1, 20 g of tin(II) di(2-ethylhexanoate), and 2 g of gallic acid were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 235° C. for 4 hours in a mantle heater in a nitrogen atmosphere.

Thereafter, the temperature was dropped to 180° C., 2 g of tertiary butyl catechol was added, and the temperature was then raised to 205° C. over 8 hours. Thereafter, the resultant was allowed to react under a reduced pressure condition at 8 kPa until it reached a predetermined softening point, thereby obtaining desired Polyester Resin B.

The resulting Polyester Resin B was pulverized using a pulverizer "SF-1" (available from Sanriki Seisakusho Co., Ltd.).

Production Example 3 (Polyester Resin C)

An alcohol component and a carboxylic acid component for a polyester resin, which are shown in Table 1, 20 g of tin(II) di(2-ethylhexanoate), and 2 g of gallic acid were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 235° C. for 4 hours in a mantle heater in a nitrogen atmosphere.

Thereafter, the temperature was dropped to 180° C., 2 g of tertiary butyl catechol was added, and the temperature was then raised to 205° C. over 8 hours. Thereafter, the resultant was allowed to react under a reduced pressure condition at 8 kPa until it reached a predetermined softening point, thereby obtaining desired Polyester Resin C.

The resulting Polyester Resin C was pulverized using a pulverizer "SF-1" (available from Sanriki Seisakusho Co., Ltd.).

TABLE 1

| | | | Production Example | | | | | |
|---|---|---|---|---|---|---|---|---|
| | | | 1 | | 2 | | 3 | |
| | | | Polyester resin | | | | | |
| | | | A | | B | | C | |
| | | | Charged amount (g) | Molar ratio *3 | Charged amount (g) | Molar ratio *3 | Charged amount (g) | Molar ratio *3 |
| Raw material monomer | Alcohol component | BPA-PO *1 | — | — | 125 | 35 | 89 | 25 |
| | | BPA-EO *2 | 314 | 96.5 | 211 | 65 | 244 | 75 |
| | | Glycerin | 3 | 3.5 | — | — | — | — |
| | Carboxylic acid component | Fumaric acid | 21 | 18.4 | — | — | — | — |
| | | Maleic acid | 101 | 86.8 | — | — | — | — |
| | | Adipic acid | — | — | — | — | 29 | 20 |
| | | Terephthalic acid | — | — | 158 | 95 | 133 | 80 |
| Physical properties | Softening point (° C.) | | 104 | | 111 | | 104 | |
| | Acid value (mgKOH/g) | | 15.6 | | 5.1 | | 12.7 | |
| | Glass transition point (° C.) | | 48 | | 70 | | 58 | |
| | Number average molecular weight | | 4900 | | 3500 | | 3800 | |

*1 BPA-PO: Polyoxypropylene oxide (2.2) adduct of bisphenol A
*2 BPA-EO: Polyoxyethylene oxide (2.2) adduct of bisphenol A
*3 Molar amount based on 100 mol of alcohol component (molar ratio)

Example A1 (Asphalt Composition)

200 g of straight asphalt (penetration: 53) dissolved at 180° C. was weighed into a 300-mL stainless steel cup. 50 g of Polyester Resin A and 2.5 g in terms of an effective amount of a dispersant "SOLSPERSE 11200" (available from Lubrizol Corp., a 50% by mass solution) were added, and the contents were heated at 180° C. until Polyester Resin A was dissolved. Thereafter, the resultant was stirred at 8,000 rpm for 2 minutes with a homomixer "HOMO MIXER MARK II" (available from Tokushu Kika Kogyo Co., Ltd.), thereby obtaining an asphalt composition. A particle diameter of the polyester resin in the resulting asphalt composition was 50 μm or less.

Examples A2 to A11 and Comparative Examples A1 to A2

Asphalt compositions were obtained in the same manner as in Example A1, except for changing the asphalt to asphalt shown in Table 1 and the dispersant to a dispersant shown in Table 2, respectively. A particle diameter of the polyester resin in each of the resulting asphalt compositions was 50 μm or less.

Example M1 and Comparative Example M1
(Asphalt Mixture)

A planetary type mixing machine "NKA-102" (a vertical asphalt mixer, available from Nikken K.K.) heated at 175° C. was charged with 94.5 parts by mass of an aggregate of the following composition heated at 180° C. Thereafter, straight asphalt (penetration: 53), a polyester resin, and a dispersant, which are shown in Table 3, were charged and mixed for 270 seconds.

After mixing, the mixture was stored in a metal vat at 175° C. for 30 minutes, then charged in a mold of a Marshall stability tester "LA-160" (available from Sanyo Testing Machines Co., Ltd.), and filled through double-sided compacting by dropping a weight of 4.5 kg from a height of 45 cm of 75 times per one side by using a Marshall automatic compactor "LA-176" (available from Sanyo Testing Machines Co., Ltd.).

<Composition of Aggregate>

No. 6 crushed stone: 37.0% by mass (material: hard sandstone)

TABLE 2

| | Asphalt composition | | | | | | | Evaluation | |
|---|---|---|---|---|---|---|---|---|---|
| | | Polyester resin | | Dispersant | | | | Solubility of dispersant in asphalt | Number of days of storage at 180° C. |
| | Asphalt | Kind | Amount (parts by mass) *1 | Kind | Functional group | Base number (mg KOH/g) | Amount of dispersant (parts by mass) *2 | | Day 1 / Day 5 |
| Comparative Example A1 | Straight asphalt | A | 25 | None | — | — | — | — | C  C |
| Example A1 | Straight asphalt | A | 25 | Solsperse 11200 | Base | 37 | 5 | A | A  A |
| Example A2 | Straight asphalt | A | 25 | Solsperse 38500 | Base | — | 5 | B | B  B |
| Example A3 | Straight asphalt | A | 25 | Ajisper PB822 | Base | 17 | 5 | B | B  B |
| Example A4 | Straight asphalt | A | 25 | Solsperse 11200 | Base | 37 | 10 | A | A  A |
| Example A5 | Straight asphalt | B | 25 | Solsperse 11200 | Base | 37 | 10 | A | A  A |
| Example A6 | Straight asphalt | B | 25 | Solsperse 13940 | Base | 90 | 10 | A | A  A |
| Comparative Example A2 | Modified II type asphalt | A | 25 | None | — | — | — | — | C  C |
| Example A7 | Modified II type asphalt | A | 25 | Solsperse 11200 | Base | 37 | 5 | A | A  A |
| Example A8 | Modified II type asphalt | C | 25 | Solsperse 11200 | Base | 90 | 5 | A | A  A |
| Example A9 | Modified II type asphalt | C | 3 | Solsperse 11200 | Base | 90 | 5 | A | A  A |
| Example A10 | Modified II type asphalt | C | 3 | Solplus K240 | Base | 80 | 2.5 | A | A  A |
| Example A11 | Modified II type asphalt | C | 1 | Solsperse 11200 | Base | 90 | 5 | A | A  A |

*1 Addition amount based on 100 parts by mass of asphalt (parts by mass)
*2 Addition amount based on 100 parts by mass of polyester resin (parts by mass)

The dispersants and the modified II type asphalts shown in the table are as follows. In addition, all of the following dispersants are soluble in toluene (SP value: 8.9).

Solsperse 11200: "SOLSPERSE 11200", available from Lubrizol Corp.

Solsperse 13940: "SOLSPERSE 13940", available from Lubrizol Corp.

Solsperse 38500: "SOLSPERSE 38500", available from Lubrizol Corp.

Solplus K240: "SOLPLUS K240", available from Lubrizol Corp.

Ajisper PB822: "AJISPER PB822", available from Ajinomoto Fine-Techno Co., Inc.

Modified II type asphalt (SBS modified asphalt): "POLYPHALT SS", available from Nichireki Co., Ltd.

No. 7 crushed stone: 18.5% by mass (material: hard sandstone)

Crushed sand: 29.0% by mass (material: hard sandstone)

Fine sand: 9.5% by mass (material: washed sand)

Stone dust: 6.0% by mass (material: limestone)

Passing mass %:
Sieve opening 19 mm: 100% by mass
Sieve opening 13.2 mm: 99.2% by mass
Sieve opening 4.75 mm: 61.9% by mass
Sieve opening 2.36 mm: 42.4% by mass
Sieve opening 600 μm: 26.3% by mass
Sieve opening 300 μm: 17.9% by mass
Sieve opening 150 μm: 9.2% by mass
Sieve opening 75 μm: 5.7% by mass Various evaluation tests were performed. The results are shown in Table 3.

TABLE 3

| | Asphalt | | Polyester resin | | Dispersant | | Aggregate (parts by mass) | Evaluation |
| --- | --- | --- | --- | --- | --- | --- | --- | --- |
| | Kind | Amount (parts by mass) | Kind | Amount (parts by mass) | Kind | Amount (parts by mass) | | Dry strength (kN) |
| Comparative Example M1 | Straight asphalt | 5.5 | B | 1.1 | None | — | 94.5 | 36.7 |
| Example M1 | Straight asphalt | 5.5 | B | 1.1 | Solsperse 11200 | 0.1 | 94.5 | 38.9 |

In the light of the above, it can be understood that the asphalt mixture using a dispersant is excellent in the dry strength as compared with the case not using the dispersant.

The invention claimed is:

1. An asphalt composition comprising
asphalt,
0.5 through 30 parts by mass based on 100 parts by mass of the asphalt of a polyester resin having a number average molecular weight in the range 3000 through 8000, said polyester resin comprising an alcohol component-derived constituent unit and a carboxylic acid component-derived constituent unit, wherein the alcohol in the alcohol component-derived constituent unit has from 2 through 8 hydroxyl groups and wherein the carboxylic acid in the carboxylic acid component-derived constituent unit is a $C_3$-$C_{10}$ aliphatic dicarboxylic acid, an aromatic dicarboxylic acid, a trivalent to hexavalent carboxylic acid, or an acid anhydride or $C_1$-$C_3$ alkyl ester thereof, and
1 through 80 parts by mass based on 100 parts by mass of the polyester resin of a dispersant,
wherein the dispersant is a polyamide amine or a salt thereof which is soluble at room temperature in a single solvent of toluene, n-hexane or methyl ethyl ketone to an extent of 10 g/100 mL or more.

2. The asphalt composition according to claim 1, wherein the dispersant has a base number of 10 mgKOH/g or more and 150 mgKOH/g or less.

3. The asphalt composition according to claim 1, wherein the polyester resin has a number average molecular weight in the range 4000 through 5000.

4. The asphalt composition according to claim 1, wherein the content of the polyester resin ranges from 15 through 25 parts by mass based on 100 parts by mass of the asphalt.

5. The asphalt composition according to claim 1, wherein the content of the dispersant ranges from 5 through 20 parts by mass based on 100 parts by mass of the polyester resin.

6. An asphalt mixture comprising the asphalt composition according to claim 1 and an aggregate.

7. A road paving method comprising a step of laying the asphalt mixture according to claim 6, thereby forming an asphalt paving material layer.

8. A method for producing the asphalt mixture according to claim 6, comprising mixing the asphalt, the polyester resin, the dispersant, and the aggregate at 130° C. or higher and 200° C. or lower.

\* \* \* \* \*